(12) United States Patent
Kussmaul et al.

(10) Patent No.: US 8,122,096 B2
(45) Date of Patent: Feb. 21, 2012

(54) METHOD AND SYSTEM TO DETERMINE A USER SPECIFIC RELEVANCE SCORE OF A MESSAGE WITHIN A MESSAGING SYSTEM

(75) Inventors: Timo Kussmaul, Boeblingen (DE); Hendrick Haddorp, Holtzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/910,950

(22) Filed: Oct. 25, 2010

(65) Prior Publication Data
US 2011/0040843 A1 Feb. 17, 2011

Related U.S. Application Data

(63) Continuation of application No. 11/424,557, filed on Jun. 16, 2006, now Pat. No. 7,860,933.

(30) Foreign Application Priority Data

Oct. 4, 2005 (EP) ..................................... 05109201

(51) Int. Cl.
*G06F 15/16* (2006.01)
*G06F 15/173* (2006.01)
*G06F 17/00* (2006.01)

(52) U.S. Cl. ............................ 709/206; 709/223; 706/45

(58) Field of Classification Search .................. 709/206, 709/223–224; 706/45
See application file for complete search history.

(56) References Cited

U.S. PATENT DOCUMENTS

| 6,012,053 | A | * | 1/2000 | Pant et al. | ............................... | 1/1 |
| 7,007,067 | B1 | * | 2/2006 | Azvine et al. | .................. | 709/206 |
| 7,315,826 | B1 | * | 1/2008 | Guheen et al. | ................ | 705/7.29 |
| 2006/0010217 | A1 | * | 1/2006 | Sood | .............................. | 709/206 |

FOREIGN PATENT DOCUMENTS

| JP | 09054733 A1 | 2/1997 |
| JP | 2001175680 A1 | 6/2001 |
| WO | WO 9529451 A1 * | 11/1995 |

* cited by examiner

*Primary Examiner* — Peling Shaw
(74) *Attorney, Agent, or Firm* — David A. Dagg

(57) ABSTRACT

The present invention refers to a method and system to determine automatically a user specific relevance score of a message within a messaging system in a client-server environment, the message being provided with message specific meta-information. The disclosed method includes analyzing by means of an analyzing component of the client-server environment the meta-information of the message with respect to correlations of the message with other messages, recording and classifying the correlations of the message with the other messages, deriving from such identified and classified correlations a message model reflecting the correlations of the message with the other messages, the messages being represented by accordingly linked nodes, monitoring by means of a monitoring component of the client-server environment how the message is processed, calculating by means of a calculating component a numerical relevance score for the message, the calculation using a user specific ranking scheme and being based on the message model and on the monitored processing, and assigning the calculated numerical relevance score by means of an assigning component of the client-server environment to the respective node within the message model.

18 Claims, 6 Drawing Sheets

| action on message | $r_{action}$ |
|---|---|
| not read | 0 |
| read and cancelled | 0 |
| read and stored | +1 |
| read and forwarded | +2 |
| answered within one day | +3 |
| answered within one hour | +4 | ized by the sender, the priority in the sending queue of the
METHOD AND SYSTEM TO DETERMINE A USER SPECIFIC RELEVANCE SCORE OF A MESSAGE WITHIN A MESSAGING SYSTEM

CROSS REFERENCE TO RELATED APPLICATIONS

The present application is a Continuation under 35 U.S.C. 120 of commonly assigned prior U.S. application Ser. No. 11/424,557, filed Jun. 16, 2006 in the names of Timo Kussmaul and Hendrik Haddorp, now allowed, and accordingly also claims priority under 35 USC 119 to European Patent Application Number EP05109201.3, filed Oct. 4, 2005.

FIELD OF THE INVENTION

The present invention refers to the field of data management, more particularly to the field of prioritizing or classifying documents or messages of a content management system or a messaging system. The present invention relates to a method and a system to determine a user specific relevance score of a message within a messaging system. The invention further relates to a computer program product with a computer-readable medium with a computer program stored on the computer-readable medium with program coding means which are suitable for carrying out such a method when the computer program runs on a computer.

BACKGROUND OF THE INVENTION

Today, search and text mining functions allow a user to search for words or phrases in electronic documents of a database as for example in electronic messages like emails and other types of messages. These functions calculate a relevance of a message depending on search terms inputted by the user and based on the content of the message, as for example on an email content. This calculation does not account for any meta-information of the message.

For clarification purposes, the differences between a document content and the meta-information related to that document as it should be understood within the scope of the present patent application is shortly explained in the following. The message content or the content of another type of document comprises all text, graphics, audio, video, etc. included in the so-called message or document body. The meta-information related to a message or a document comprises all information about the document or the message and also the processing of the document or the message. In case of an email or another kind of message the processing of the message in the mail system includes for example an addressing information as indicated by fields "To", "CC", "BCC", "Send by", date and time fields, information about the message thread, i.e. associated messages, and information about the processing of a message and the message thread. That means that the meta-information gives information about any action the user did on the message, as for example, whether the user read the message or replied to the message. With respect to the message thread, the meta-information can disclose how much activity has been on the message thread, as for example how many people replied to any message within the message thread.

Referring to the field of messaging systems, a prior art messaging client cannot indicate a relevance of a new message to a user as the reader of that message. In lieu thereof, it performs a chronological ordering of new messages and may additionally interpret a message field which denotes an importance of the message. This field is, however, set by the sender of the message and normally does not reflect the relevance for the reader.

According to another scenario in the prior art, a user can search in his email system for messages containing for example the word "portal". A prior art search function displays a list of search results which may be sorted according to a statistical and linguistic analysis of the message content in relation to the pre-given search term. The sorting of the list of search results is, however, not user based but globally calculated.

The prior art search function does not consider the importance of the sender with respect to the user as reader of the message. Moreover, it is not possible to consider messages that the user or other recipients replied as to be more relevant than messages that the user or other recipients didn't even read.

Therefore, it would be desirable to provide a method to determine a user specific relevance score of a message within a messaging system based on meta-information of the message, thus, accounting for user specific or user defined relevance.

SUMMARY OF THE INVENTION

The present invention proposes a method to determine automatically a user specific relevance score of a message within a messaging system in a client-server environment, the message being provided with message specific meta-information. The method comprises the steps of analysing by means of an analysing component of the client-server environment the meta-information of the message with respect to correlations of the message with other messages, recording and classifying the correlations of the message with the other messages, deriving from such identified and classified correlations a message model reflecting the correlations of the message with the other messages, the messages being represented by accordingly linked nodes, monitoring by means of a monitoring component of the client-server environment how the message is processed, calculating a numerical relevance score for the message, the calculation using a user specific ranking scheme and being based on the message model and on the monitored processing, and assigning the calculated numerical relevance score by means of an assigning component of the client-server environment to the respective node within the message model.

Analysing is performed with respect to correlations among messages within the messaging system. Therefore, the analysing component correlates the messages which are associated, e.g. belong to the same message thread. It is possible that the analysing component may use a specific correlation ID or perform an analysis of the message content and meta-information. By means of such a correlation analysis it is possible to derive therefrom a specific position of a message with respect to other messages within the messaging system which have some association with each other.

With help of analysing correlations of the message with other messages it is possible to derive thereby a kind of history for the message as a first step for employing the ranking scheme according to which the relevance score for the message has to be calculated.

The processing of the message which is monitored provides a further step for employing the ranking scheme and is also used for the calculation of the numerical relevance score for the message.

That means that a specific processing of the message can be associated with a corresponding rating which is recorded in the ranking scheme.

The user specific ranking scheme is to be understood as a global scheme of multiple aspects according to which the relevance of the message for the user can be characterized user specifically. Therefore, the message is regarded with respect to different such aspects leading to corresponding individual relevance scores, respectively, which are used to calculate the real or ultimate numerical relevance score for that message. The term "user specific" indicates "user individually adapted" or "aligned with the user".

The principles of the method according to the present invention are not limited to messages of a messaging system, but can also be used for any documents of a content management system. Such a content management system can be part of a messaging system, a palm organizer or of a mobile phone.

According to a further embodiment of the proposed method, the monitoring component is divided in a server component monitoring the general processing of the message on the server and a client component monitoring the specific processing of the message on the client.

The server component monitors the general and global processing of the message which can be registered on the server, i.e. actions on the message performed by any user such as for example the lapse of time until the message is replied, forwarded and/or deleted by any user. This can be "how many recipients of the forwarded message reply" and/or "which action is performed by other users with similar ranking schemes on the same message".

In contrast to this, the client component monitors the user individual handling of the message. It is possible that the client component enables the user to assign an explicit rating to the message. That means that the user can assign directly a numerical value to the message with respect to his own evaluation or judgement of the message. This can be dependent for example on the sender of the message and/or on the content of the message.

It is also possible that the client component monitors the user handling of the message, each handling being connected with a specific rating according to a pre-given ranking scheme.

As already indicated, it is possible that the overall user specific ranking scheme which serves as basis for the calculation of the numerical relevance score of the message is a combination of different sub-schemes, each referring to different aspects under which the message can be regarded. There can be for example a first ranking scheme considering and classifying the processing of the message monitored by the server component and a second ranking scheme referring to user actions monitored by the client component.

It is also possible that monitoring the processing of the message is performed with respect to at least one user specific criteria. In such a case, there are two aspects which influence the rating of the message. First the messages can be classified and selectively monitored with respect to at least one criteria, as for example a specific sender or a specific subject of the message. Second, the processing of the message is classified. Both together can be combined and result in a rating which is in agreement with the ranking scheme which can be pre-defined by the user.

By means of the proposed method a relevance score is computed which indicates the relevance of a message based on message meta-information. By means of the proposed method, messages of a plurality of messages, each message being assigned by a numerical relevance score can be sorted according to their respective relevance scores in a list. Such a list reflects clearly the importance of anyone of the messages of the plurality of messages for the user. The relevance scores calculated according to the proposed method can then be combined with a result of a prior art search function if desired.

Moreover, such a list can be created with respect to at least one criteria which can be predefined by the user. It could be important for example to determine for the calculation of the relevance score of the message the organisational context of the sender and the recipients of the message and the relationship between them. It is possible for example to differentiate in view of the relevance score between messages related to the privacy and business-related messages. A lot of further scenarios are imaginable which could be taken into account when calculating the relevance score of a message.

It is possible, as already mentioned that the ranking scheme is at least partly pre-defined by the user. That means, that the user handling the message in question has the possibility to define different criteria according to which the message should be monitored and to weight the message according to its respective importance with respect to those criteria. The user is enabled to manage the rating of the message according to his own needs and he is no longer limited to a global calculation of the relevance based on a statistical and/or linguistic analysis which is not user specific.

Furthermore, the criteria with respect to which the message should be monitored can change. Therefore, it is possible to account for an alternating importance of certain criteria of the ranking scheme on the basis of which the monitoring and the calculating should be performed. Thus, the calculation of the numerical relevance score for the message is performed dynamically.

Moreover, it is possible that the weighting for the at least one criteria within the ranking scheme changes. A dynamically performed calculation of the numerical relevance score for the message makes allowance for such a change in weighting.

It is possible for example that the user chooses as the at least one criteria the originator of the message. Therefore, the monitoring component monitors and analyses the message with respect to the criteria "originator of the message". At a later date it is possible that the user is more interested with respect to the message "at which time the message was generated". The monitoring component adapts to the new criteria such that it analyses the meta-information of the message now with respect to the new criteria. Therefore, the analysing of the meta-information of the message is performed dynamically.

In a further case it is possible that the user is first particularly interested in all messages originating from a specific author, but at a later date the importance of said specific author decreases for the user and another author gains more importance. Therefore, the weighting of the different authors changes which will be reflected within the ranking scheme. The calculation of the numerical relevance score for each message will be adapted accordingly, thus being performed dynamically.

Within the scope of the present invention, messages also include emails which should be ordered according to a user specific hierarchy. In case of such a messaging system, it is possible, as already indicated, to monitor the message according to at least one user action performed on the message. That means that in this case the monitoring component monitors how the message is processed by the user. Such a user action can be for example "reading the message", "deleting the message", "saving the message in which folder", "classifying the message", "replying the message", "forwarding the message to how many recipients".

The list of possible actions described here should only be an extract or a selection of possible user actions with respect to which monitoring and analysing can be performed.

According to a further embodiment of the method according to the present invention calculating the relevance score of the message is based on a previous given relevance score of the message and the relevance scores of the other messages correlated with the one message.

It is possible, that the calculated relevance score of the message is a second numerical function of the previous given relevance score of the message and a function value of a first numerical function of the relevance scores of the correlated messages. The first and second functions can be chosen, respectively, as any one of the group of functions: max(Z), min(Z) and ave(Z), wherein Z is a set of values.

The numerical relevance score of the message can be recalculated and assigned dynamically to the message with respect to an actual handling of the message or of the correlated messages.

Furthermore, it is possible that a recalculation of the relevance score of the message originates the recalculation of the respective relevance scores of the correlated messages, which is iteratively performed till a termination criteria is met.

With regard to correlations a further embodiment of the method according to the present invention provides that the analysing and calculating steps comprise with respect to the message in question as a first message the following steps to be performed iteratively:
  determining all messages correlated with the message in question forming together with the message in question a set of messages,
  noting respective relevance scores for all messages of the set of messages,
  calculating with a first pre-given function a first numerical value from the relevance scores of the messages correlated with the message in question,
  calculating with a second pre-given function a second numerical value from the first numerical value and the relevance score of the message in question,
  if the second numerical value differs from the relevance score of the message in question, noting the second value as the relevance score of the first message and repeating with respect to a predefined termination criteria the previous steps for all messages of the set of messages other than the message in question,
  otherwise stopping.

Regarding for example the situation that in case of the messaging system, a new message arrives which still has no relevance score, but which probably correlates with other messages being called neighbours of the new message. Therefore, a relevance score has to be assigned to the new message represented by a node X. Zero can be chosen as initial value for the relevance score of node X.

First all neighbours $Y_i$ of X have to be identified forming a group Y. Their respective current relevance scores $r_{y_i}$ are stored for later comparison with newly respective recalculated values. In order to calculate the new relevance score of node X a function h is called. The function h may be a function of the relevance score of node X and of a further function g.

The function g may be chosen from a variety of functions on the group Y. In an example the function g is the average of the relevance scores of the nodes of Y. In further examples the function g is either the maximum or the minimum of the relevance scores from Y.

The function h again may be chosen from a variety of functions. In a first example it is the average of the value of g and the relevance score of node X. Further examples for h may be the maximum or the minimum of the value of g and the relevance score of node X. Finally the value of h is assigned to the relevance score of node X.

With the new value for the relevance score of X the respective relevance scores of the neighbour nodes of group Y will change if their respective relevance scores are recalculated as well. This may be extended to all the neighbour nodes of all members of group Y. Finally the relevance score of every node which is a neighbour of a node that faced a recalculation of its relevance score is recalculated.

With the change of all these relevance scores a new calculation of the relevance score for node X may result in a different relevance score and the above calculations are performed again. This step is repeated until the relevance score of a node does not change any more or another termination criteria is reached that limits the number of iterations. For example a termination criteria may be the number of recalculations of a relevance score of a given node exceeding a defined value.

Regarding the same situation but the case, that a user receiving the new message assigns a personnel relevance score to that message represented by node X. Starting with the new relevance score for X all relevance scores of the neighbour nodes of X will change (of course only if the chosen model for the computation of the relevance score of a node is a function of neighbour nodes). The same steps as above are performed with the only difference that the initial value of the relevance score of the node X is not zero but pre-given by the user.

It is possible that the steps of analysing the meta-information of each document and/or of calculating the numerical relevance score for each document is performed dynamically.

It is possible that the relevance score of the message is displayed to a user referring to the message. The relevance score can be displayed as a pop-up window.

Furthermore, it is possible that the message model is discarded if no user action took place for a defined lapse of time.

The invention also relates to a scoring system to determine a user specific relevance score of a message within a messaging system in a client-server environment, the message being provided with message specific meta-information. The system comprises an analysing component configured to analyse the meta-information of the message with respect to correlations of the message with other messages, a recording component configured to record and classify the correlations of the message with the other messages, a modelling component configured to derive from such identified and classified correlations a message model reflecting the correlations of the message with the other messages, the messages being represented by accordingly linked nodes, a monitoring component configured to monitor how the message is processed, a calculating unit configured to calculate a numerical relevance score for the message, the calculation using a user specific ranking scheme and being based on the message model and on the monitored processing, and an assigning unit configured to assign the calculated numerical relevance score to the respective node within the message model.

It is possible that the processing of the message is directly associated with a rating which is predefined by the user himself. It is also possible that the rating of the message is derived from a user specific behaviour pattern in connection with messages. That means that the rating could be directly predefined by the user, but it is also possible that the rating is derived indirectly from the user's behaviour or from other user relevant characteristics of the messages.

In a further possible embodiment of the system according to the present invention the monitoring component is flexible and configured to analyse meta-information of the message in question dynamically thereby taking into account changing or altering criteria the analysis to be based on. That means that the monitoring component can perform an analysis in a first step on the basis of a first criteria and at a later date with respect to another criteria. It is possible that the criteria of the rating of the message change in the course of time. It is possible for example that the message should be classified with respect to its sender and at a later date it is more important to classify the message with respect to its subject.

Furthermore, it is possible that the calculating component is configured to calculate the numerical relevance score for the message dynamically thereby taking into account any external factor. That means that the weighting with respect to a certain monitoring criteria can change directly followed by a changing of calculation of the numerical relevance scores for the respective messages. A business partner can act for example as external factor, which at first was very important and all messages written by this business partner got a high priority, but at a later date the business partner lost his importance because of lapse of the related business.

In a further possible embodiment of the system according to the present invention the calculating component is adapted to perform in case of a recalculation of the relevance score of the message in question an iterative recalculation of the relevance scores of all those messages which are related to the message in question. That means that not only the relevance score of a specific message is updated when any circumstances change but also the relevance scores of all messages within the same thread. Such a thread can be in case of a messaging system a chain of messages concerning one and the same subject.

According to a further embodiment of the system according to the present invention, the analysing component and the calculating component are configured, respectively, to perform with respect to a message in question the following iterative steps:
  determining all messages correlated with the message in question forming together with the message in question a set of messages,
  noting respective relevance scores for all messages of the set of messages,
  calculating with a first pre-given function a first numerical value from the relevance scores of the messages correlated with the message in question,
  calculating with a second pre-given function a second numerical value from the first numerical value and the relevance score of the message in question,
  if the second numerical value differs from the relevance score of the message in question, noting the second value as the relevance score of the message in question and repeating with respect to a predefined termination criteria the previous steps for all messages of the set of messages other than the message in question,
  otherwise stopping.

In case of the messaging system it is possible that by means of the analyzing unit and the calculating unit, a relevance score has to be assigned to a message represented by a node X. First all neighbors $Y_i$ of X have to be identified forming a group Y. Their respective current relevance scores $r_{Y_i}$ are stored for later comparison with newly respective recalculated values. In order to calculate the new relevance score of a node X a function h is called. The function h may be a function of the relevance score $r_X^{old}$ of node X and of a further function g. The function g may be chosen from a variety of functions on the group Y. In an example the function g is the average of the relevance scores of the nodes of Y. In further examples the function g is either the maximum or the minimum of the relevance scores from Y.

The function h again may be chosen from a variety of functions. In a first example it is the average of the value of g and the relevance score of node X. Further examples for h may be the maximum or the minimum of the value of g and the relevance score of node X. The computed value of h is assigned to node X as its new relevance score $r_X$. With the new value $r_X$ for the relevance score of X the respective relevance scores of the neighbor nodes of group Y may change if the new relevance score $r_X$ of node X differs from the previous relevance score $r_X^{old}$ of node X. In that case, their respective relevance scores have to be recalculated as well. This may be extended to all neighbor nodes of all members of group Y. Finally the relevance score of every node which is a neighbor of a node that faced a recalculation of its relevance score is recalculated. With the change of all these relevance scores a new calculation of the relevance score $r_X$ for node X may result in a different relevance score again and the above calculations are performed again. This step is repeated until the relevance score of a node does not change any more or another termination criteria is reached that limits the number of iterations. For example a termination criteria may be the number of recalculations of a relevance score of a given node exceeding a defined value.

Alternatively, it is possible that the user assigns a personal relevance score to a message represented by node X. Starting with the new relevance score for X all relevance scores of the neighbour nodes of X will change (of course only if the chosen model for the computation of the relevance score of a node is a function of neighbouring nodes). The same steps as above are performed with the only difference that the initial value of the relevance score of the node X is not zero but pre-given by the user.

The monitoring component can also be configured to analyse the message with respect to an organisational context of the message. Such an organisational context can reflect for example the sender, the recipients of the message and also the relationships between them.

In a further possible embodiment of the system according to the present invention the system components can be functionally distributed among at least one client and one server. In case of the messaging system it is possible that the system components are distributed among a messaging client and a messaging server. The components perform in close collaboration a calculation of a numerical relevance score. It is possible that each component performs an arithmetic operation on an already given relevance score. The source of the given relevance score may be a result of a prior art rating or a neutral value. By means of the different components it is possible to award the relevance score a user specific characteristic, such leading to a user specific hierarchy within a plurality of messages.

In a messaging system it is possible that the monitoring component is functionally distributed among the messaging client and the messaging server. The monitoring component as part of the server monitors for example how the message is globally processed by users, as for example "how many recipients does the new message have", "is the message deleted", "how was the message classified by the users", "is the message forwarded", "does a recipient reply to the message" or "did another user read the message when he used similar search terms".

A monitoring component as part of the messaging client monitors and controls for example processing of the message on that specific client. In case that the system components are functionally distributed among a client and a server, those components interact closely.

The calculating component can be implemented on the server or on the client or also be distributed among the client and the server.

It is possible to provide as a further system component a so-called directory component which determines the organisational context of the sender and the recipients of the message and the relationships between them.

It is possible that the system according to the present invention is configured as a single and detached system which can be connected to a server containing a messaging system for which a user specific relevance score should be assigned to a message.

It is also possible that the system according to the present invention is incorporated or at least partly incorporated within such a server containing the messaging system.

It is to be understood that the scoring system according to the present invention can also be combined functionally with a content management system and not only with a messaging system.

The invention further refers to a messaging system comprising at least one messaging client, at least one messaging server and a system according to the invention, the components of which being functionally distributed among the client and the server. The monitoring component can further be divided into several sub-components which also can be distributed among the client and the server.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figures 1, 4:
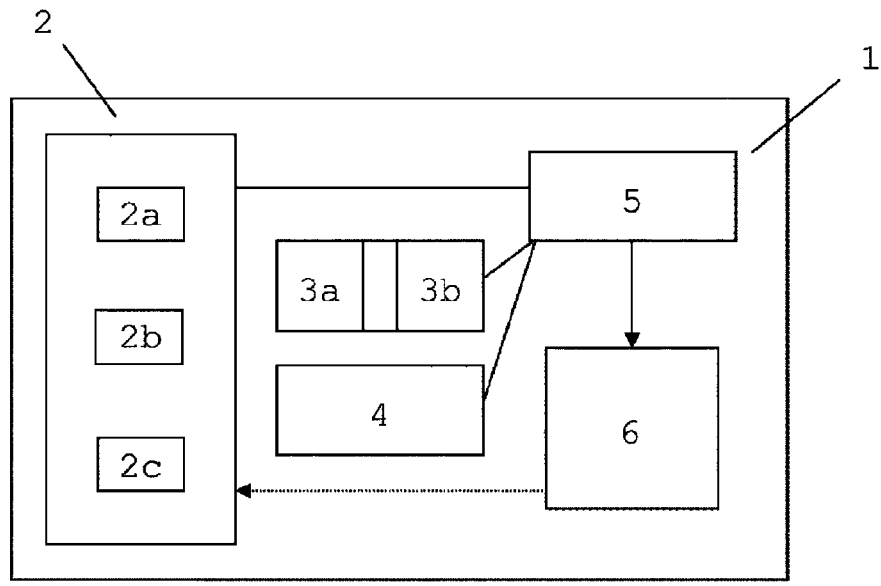
FIG. 1 shows schematically an embodiment of the scoring system according to the present invention.
FIG. 4 shows a table by means of which a message can be classified with respect to how it is processed by a user.

FIG. 1 shows a scoring system 1 which comprises several different system components. The scoring system 1 is used to determine a user specific relevance score of a message within a messaging system, the message is provided with message specific meta-information. The scoring system 1 can be connected to a messaging server or to a messaging client or to both. The scoring system 1 can also be integrated in the messaging client or the messaging server. The system components can also be functionally distributed among the messaging client and the messaging server. The scoring system comprises a first component 2 which is configured to establish a message model, a second component 3 which is configured to monitor how a message is processed, a third component 4 and a further component 5 which is configured to calculate a numerical relevance score for the message. Those components can be distributed among the messaging client and the messaging server. However, they can also be located together either on the client or on the server.

In the example shown here, the first component 2 of the scoring system, namely a message model component, is divided into three sub-components 2a, 2b and 2c. The sub-component 2a is the analysing component. It is configured to analyse the meta-information of the message with respect to correlations of the message with other messages, e.g. belong to the same message thread. The analysing component 2a may use a correlation ID or may perform an analysis on the message content and the message meta-information. The second sub-component 2b is a recording component which records and classifies the correlations of the message with the other messages. The third sub-component 2c is a modelling component. It is configured to derive from the identified (in sub-component 2a) and classified (in sub-component 2b) correlations a message model reflecting the correlations of the message with the other messages. The messages are represented in the message model by accordingly linked nodes.

A second component 3, representing the monitoring component, is further divided in a server component 3a and a client component 3b. The server component 3a monitors globally how messages are processed by users of the messaging system. This component monitors the processing of messages with respect to different pre-given criteria. A selection of such criteria can be chosen as follows:
How many recipients does a new message have?
Is a message deleted?
How was a message classified by the users?
Is a message forwarded?
Does a recipient reply to a message?
Did another user read the document when he uses a similar ranking scheme?

Each of those questions underlies a rating with respect to possible answers. Therefore, the message gets a relevance score derived from the message specific answers to those questions and the respective rating related to those questions.

The client component 3b monitors and controls processing of messages on the client. This component monitors the processing of the message in question with respect to at least one user action being performed by the user on that message. Each user action is also classified within a given rating, thus a further specific relevance score can be assigned to the message with respect to that rating.

A third component 4, namely the directory component determines an organisational context of a sender and recipients of the message and relationships between them. By means of the organisational context the message can be weighted with respect to the "distance" between the sender and the recipients of the message.

The specific processing of the message, monitored by component 3, and the weight of the organisational context, provided by component 4, are criteria being part of a user specific ranking scheme. With help of such an underlying user specific ranking scheme and the results from components 3 and 4, wherein each result corresponds to a specific score according to the ranking scheme, a real and ultimate relevance score for the message in question can be calculated by summarizing adequately the individual relevance scores as consequence of the different results of the system components 3 and 4. That means that a lot of different factors can be taken into account when determining a relevance score for a message and constituting, thereby, a user specific hierarchy within a plurality of messages. The calculation of the relevance score can be performed centrally by the calculating component. However, each component 3 and 4 can also be directly interconnected with a respective calculation sub-unit which calculates on the basis of the individual result of each component a relevance score with respect to the specific ranking scheme. Those individual scores can be summarized by the centralized calculating component 5 to a real and ultimate relevance score for the message.

A further component 6, namely, an assigning component, is configured to assign that calculated numerical relevance score to the respective node within the message model as provided by modelling component 2c.

FIG. 2 shows a possible message model which can be derived by an analysing component of a scoring system according to the present invention. The analysing component analyses, as already described in connection with FIG. 1, whether a message is associated with one or more other messages. The analysing component may use a correlation ID or perform an analysis of the message content and meta-information.

Figure 2A:
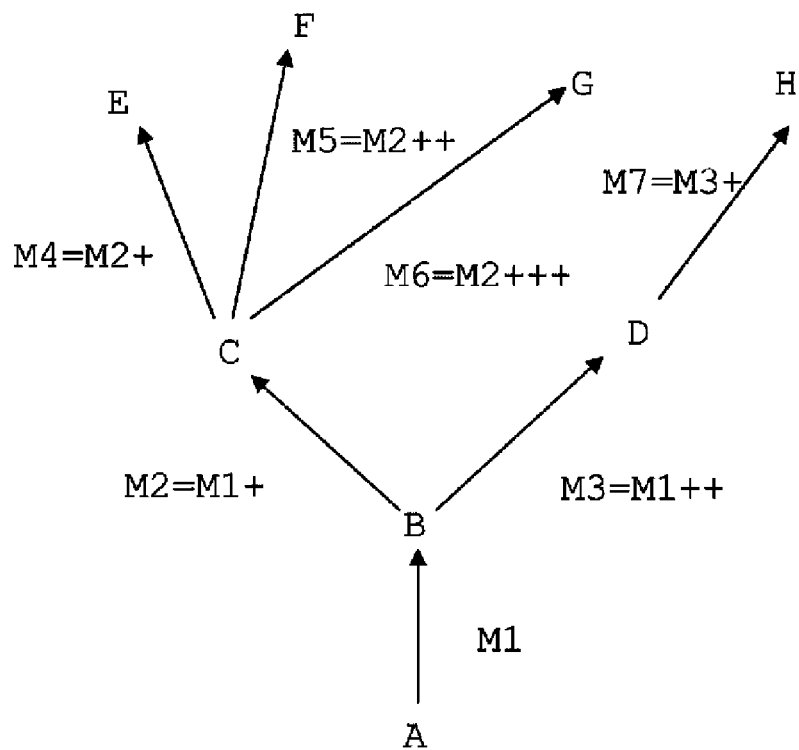
FIGS. 2a and 2b show a possible model according to which a further embodiment of a scoring system according to the present invention can work.

In the case shown here, as indicated by FIG. 2a, there are eight different users A, B, C, D, E, F, G, H. A sends a message M1 to B. B forwards M1 to C and D. B adds own remarks to the message M1, resulting in messages M2 and M3, respectively. Supplements are characterized by one or several "+"-signs. Both messages M2 and M3 rely on M1. C forwards M2 to E, F, G and supplements the message M2 with own notes, resulting in messages M4, M5 and M6, respectively. D forwards M3 to H with own remarks, resulting in message M7.

The graphic 2b shows a message model which is based on the message thread described in FIG. 2a. The different messages are represented by squares or nodes. The messages are connected via arrows indicating their corresponding relationship. A certain node represents a message including its sender and its recipient. Message M1 is not associated or correlated with any other message. An "arbitrary" node Z is created so that message M1 can be completely mapped or represented within the message model.

Therefore, the basis is established by the message M1 which was sent by A at a time point T1. At the time point T2 B as the receiver of M1 sends messages M2 and M3 to corresponding users C and D, respectively. Both messages M2 and M3 are based on M1, but completed by specific remarks. The message M2 is forwarded by C at a time point T3 to further users E, F and G. M2 is also amended by further remarks, resulting thus in M4, M5 and M6. At a time point T4, D forwarded M3 with supplemented remarks, resulting in M7, to a further user, namely H. The resulting graph or message model shows a tree structure clearly indicating the relations between the different messages. It is possible that each message gets a specific relevance score with respect to its specific position within the tree structure. Thus, a first rating can be given for the different seven messages.

Figure 2B:
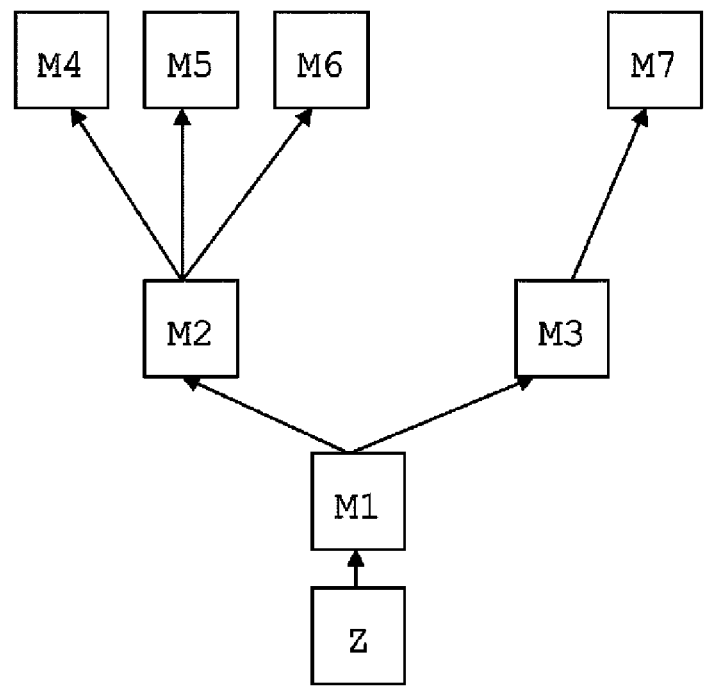
Figure 3:
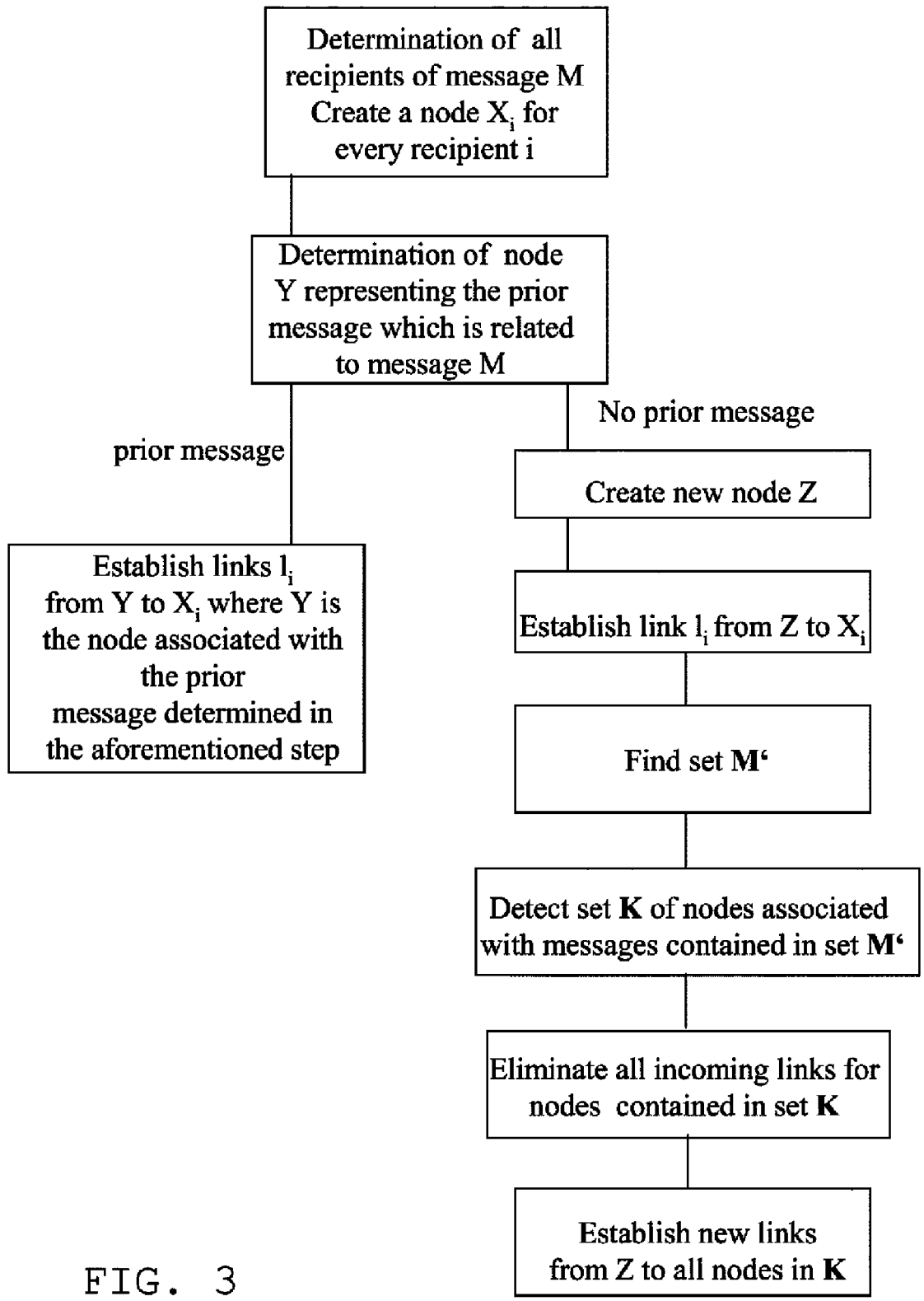
FIG. 3 shows a flowchart describing how to build up a message model as shown in FIG. 2b which can be used as basis for calculating message relevance scores considering message correlations starting from one single message.

FIG. 3 shows a flowchart describing an algorithm according to which a message model as shown in FIG. 2b can be generated, considering the correlations between different messages of a messaging system. Such a message model can afterwards be taken as basis for a calculation of a relevance score for each node within the message model.

Starting with a new message M, in a first step, an analysing component of an embodiment of a scoring system according to the present invention determines all the recipients 1, ..., i to which the message M is forwarded and assigns respective nodes $X_1, \ldots, X_i$ to those recipients 1, ..., i.

In a second step, the analysing component determines whether there is a node Y representing a prior message which is related to message M.

If there is a prior message links $l_i$ are established from node Y to nodes $X_1, \ldots, X_i$ where Y is the node associated with the prior message determined in the aforementioned step.

If there is no prior related message, a neutral node Z is introduced as node of origin of the new message M. Links $l_1, \ldots, l_i$ from Z to respective nodes $X_1, \ldots, X_i$ are established.

In case that M is not related to any prior message, duplicates of message M which have been sent to different recipients running the risk of not being considered when calculating the relevance score of message M can optionally be taken into account by the following procedure. First a set of all messages $M'=\{M_1', M_2', \ldots\}$ is detected, each message $M_i'$ having the same content as M and being not related to any prior message. Second, a set of all nodes K associated with M' is detected. Third, all existing incoming links to all nodes of K are eliminated and finally new links all originating from Z are established to each node of K.

Thus, all possible correlations of message M due to duplicates are taken into account for the calculation of the relevance score of message M.

A further component of the scoring system, as for example a client component, can now monitor and control processing of a single message, as for example of message M of FIG. 3, by a user. The message can be classified with respect to how it is processed by the user. This can be done by means of a table as indicated in FIG. 4. An implicit rating based on the processing of the message can be derived therefrom. Alternatively, it is also possible that the user performs an explicit rating. It is possible for example that whenever the user receives a message, he can manually assign a relevance score, for example, he can choose a certain rating by means of a display with appropriate icons, each icon representing a specific relevance score.

In case of an implicit rating, a ranking scheme is given according to which each action is assigned with a specific score or rating. It is possible for example that in case that the message is not read, the score is neutral and gets the value "0". In case that the message is read but no other or further action is executed, the score is also neutral getting the value "0". In case that the message is read and saved within a specific folder, the rating can increase and the score can be "+1". When the message is read and forwarded, the rating or score can be chosen as "+2". A message which is replied within a day, results in a rating of "+3". If a message is answered within 1 hour, the score or rating can be chosen as "+4".

In order to calculate a final numerical relevance score for the certain message, the relevance score derived from the tree structure of the analysing component and the relevance score resulting from the analysis of the client component have to be combined when no further criteria should be taken into account.

Considering as example one single message as starting point of a message thread, as described before, a whole message model for a messaging system can be derived therefrom. A calculating component can compute dynamically a rating for the whole message model based on the individual relevance scores of the respective nodes which represent building blocks of the super-ordinated message model.

A new relevance score of one single node leads to a new or probably changed rating of the model. That means that each node gets a new individual relevance score. A personal rating of a node as described above in connection with FIG. 4 can probably be overwritten. A personal rating can contrarily only be assigned to a blank node without any rating. The relevance score $r_x$ of one single node X within the model can be described as follows:

$$r_X = f(R_Y, r_X)$$

with $Y=\{Y_1,Y_2,\ldots\}$ being the set of neighbour nodes of node X and $R_Y=\{r_{Y1}, r_{Y2}, \ldots\}$ being the set of ratings, namely relevance scores, of these neighbour nodes of X.

f modulates the weighting of the neighbour nodes in proportion to node X. Optionally f also modulates the weighting of the neighbour nodes among each other.

The actual relevance score of a message can be transferred to a client. In order to avoid a huge data traffic, this can be done at pre-given intervals only. The client preserves the relevance score of a message which has already be processed by a user. Only the respective relevance scores of those messages which have not been processed yet are actualized and probably displayed such that the user can adapt its handling regarding those messages in accordance with the respective actual relevance scores.

Figure 5:
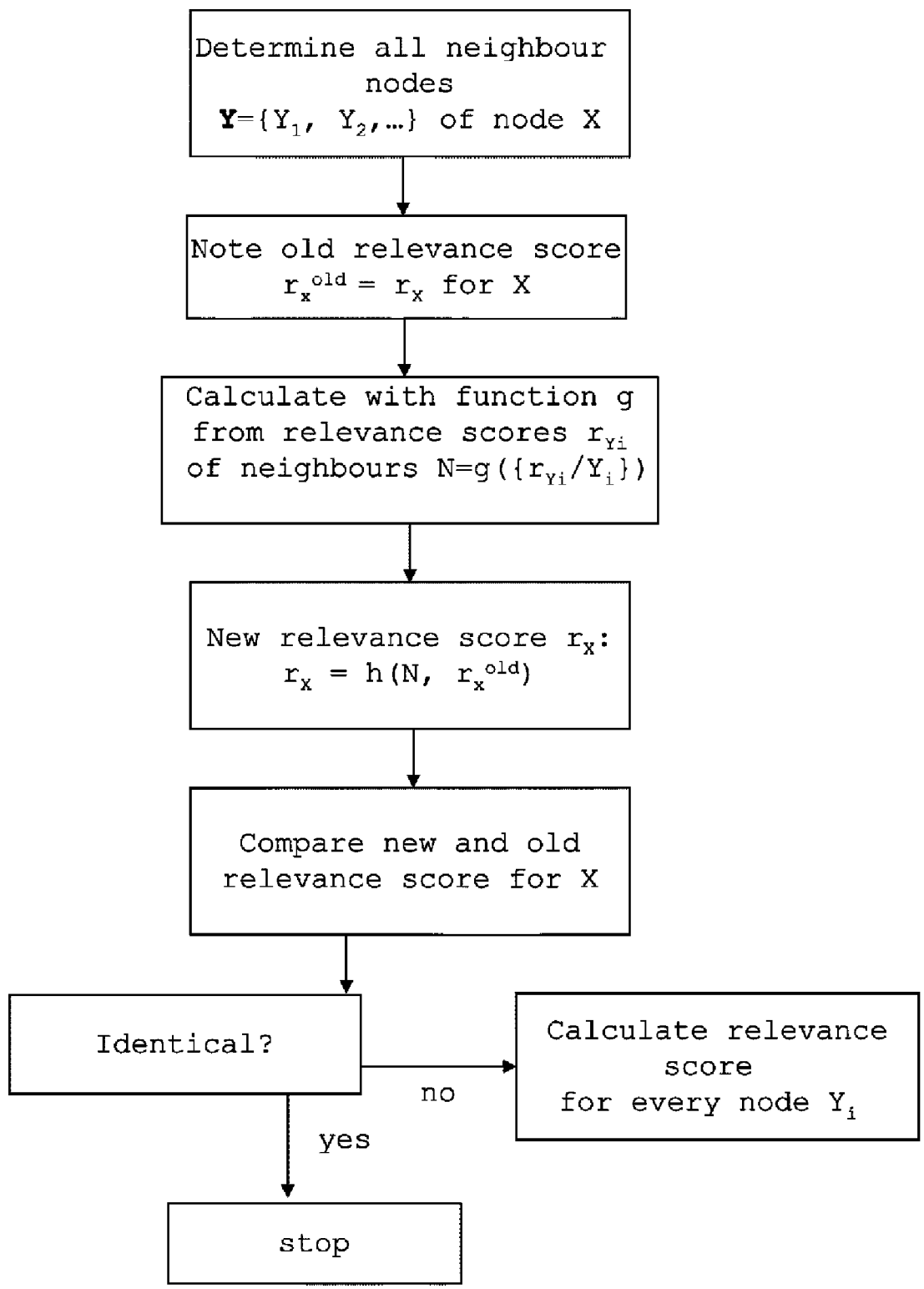
FIG. 5 shows a flowchart describing how to calculate a relevance score for a message represented by a node X within a message model according to an embodiment of the method according to the present invention.
Figure 6:
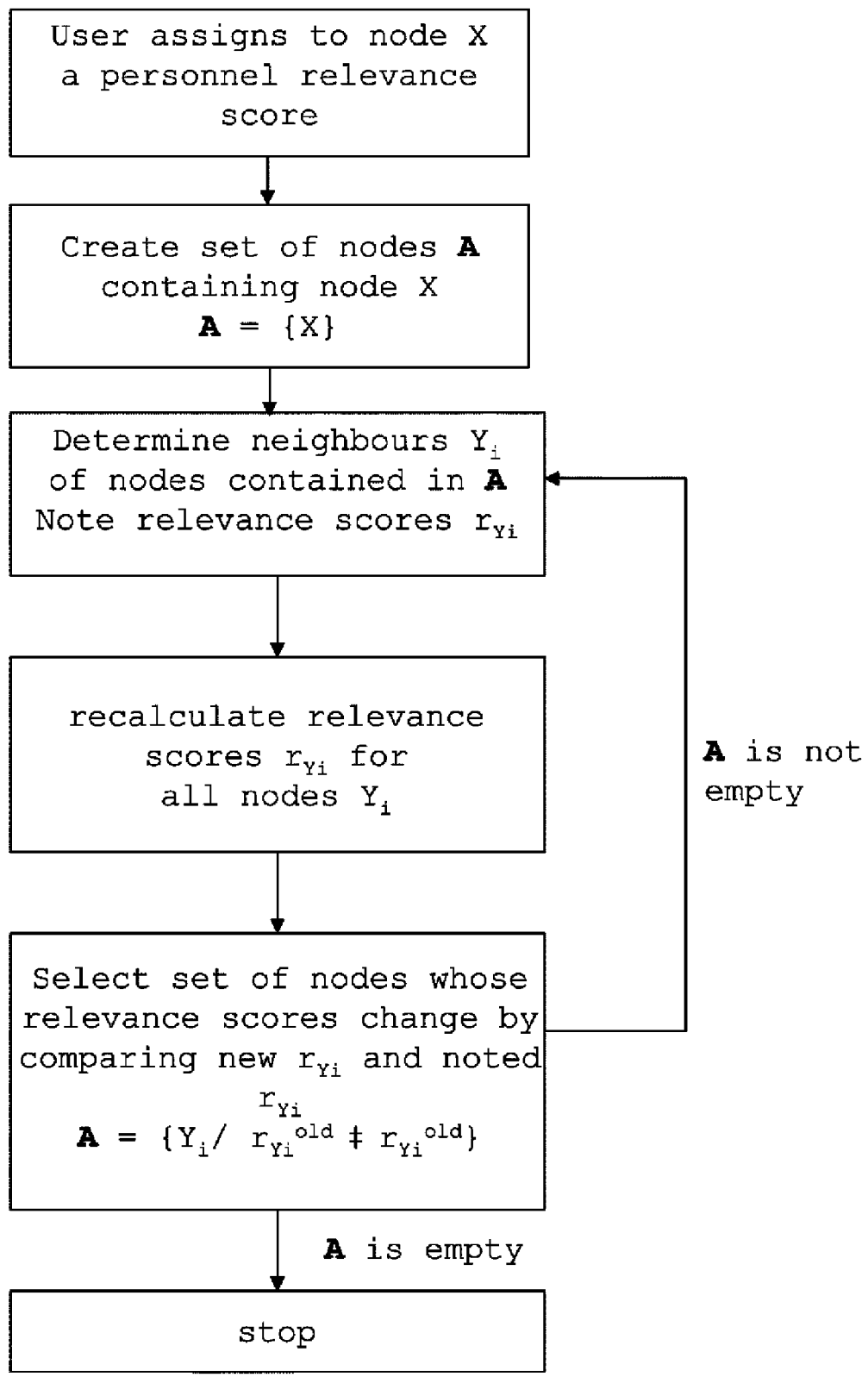
FIG. 6 shows a flowchart describing with respect to another scenario how to calculate a relevance score for a message represented by a node X within a message model according to another embodiment of the method according to the present invention.

FIGS. 5 and 6 show two different starting scenarios for the recalculation of the relevance scores within a message model as it is described above.

FIG. 5 emanates from a new message which still has no relevance score or whose current relevance score of a related message has changed. Therefore, a relevance score $r_X$ has to be assigned to that message which is represented in the following by a node X and its initial current relevance score as $r_X^{old}$.

First, all neighbor nodes $Y_i$ of X have to be identified forming a group Y. Their respective current relevance scores $r_{Yi}$ are stored for later comparison with newly respective recalculated values. In order to calculate the new relevance score of node X a function h is called. The function h may be a function of the relevance score $r_X^{old}$ of node X and of a further function g of the relevance scores $r_{Yi}$ of nodes $Y_i$.

The function g may be chosen from a variety of functions on the group Y. In an example the function g is the average of the relevance scores $r_{Yi}$ of the nodes $Y_i$ of Y. Thus, a value N from the reference scores $r_{Yi}$ of nodes $Y_i$ can be determined, namely $N=g(\{r_{Yi}/\forall Y_i \in Y\})=ave(\{r_{Yi}/\forall Y_i \in Y\})$. In further examples the function g is either the maximum $g=\max\{r_{Yi}/\forall Y_i \in Y\}$) or the minimum $g=\min(\{r_{Yi}/\forall Y_i \in Y\})$ of the relevance scores from Y.

The function h again may be chosen from a variety of functions. In a first example it is the average of the above computed value N of g and the relevance score $r_X$ of node X, namely $h=ave(N, r_X^{old})$. Further examples for h may be the maximum $h=\max(N, r_X^{old})$ or the minimum $h=\min(N, r_X^{old})$ of the value of g and the relevance score $r_X^{old}$ of node X.

Finally, the computed value of h is assigned to the relevance score $r_X$ of node X. The new relevance score $r_X$ is compared with the previous relevance score $r_X^{old}$ of node X. If the new relevance score $r_X$ and the previous relevance score $r_X^{old}$ are identical, the calculation can be stopped.

If the new relevance score $r_X$ differs from the previous relevance score $r_X^{old}$, it may be possible that with the new value $r_X$ for the relevance score of X the respective relevance scores of the neighbor nodes of group Y will also change if their respective relevance scores are recalculated as well. This may be extended to all the neighbor nodes of all members of group Y.

Finally, the relevance score of every node which is a neighbor of a node that faced a recalculation of its relevance score is recalculated according to this algorithm. With the change of all these relevance scores a new calculation of the relevance score for node X may result in a different relevance score and the above calculations are performed again. This step is repeated until the relevance score of node X does not change any more or another termination criteria is reached that limits the number of iterations. For example a termination criteria may be the number of recalculations of a relevance score of a given node exceeding a defined value.

FIG. 6 shows another scenario, namely the situation when a user assigns a personal relevance score to a message represented by a node X. The same steps as above are performed with the only difference that the initial value of the relevance score of the node X is pre-given by the user.

Starting with the new relevance score for X all relevance scores of the neighbor nodes of X will change (of course only if the chosen model for the computation of the relevance score of a node is a function of the neighboring nodes). First, a set of nodes A is created which contains node X, $A=\{X\}$.

The neighbor nodes $Y_i$ of node X are determined first, namely those which are also contained in A. The respective relevance scores $r_{Yi}$ of nodes $Y_i$ are noted. Then all relevance scores $r_{Yi}$ of nodes $Y_i$ are recalculated with respect to $r_X$ of node X.

In a next step, those nodes $Y_i$ are selected whose recalculated or new relevance scores $r_{Yi}^{new}$ differ from the first noted relevance scores $r_{Yi}^{old}$. Those nodes are represented by $A=\{Y_i/r_{Yi}^{old} \neq r_{Yi}^{new}\}$. If A is not empty, that means that at least one relevance score has changed, the calculations are performed again until all relevance scores remain stable or another termination criteria is reached that limits the number of iterations. For example a termination criteria may be the number of recalculations of a relevance score of a given node exceeding a defined value.

If A is empty, the calculation is stopped.

Figure 7:
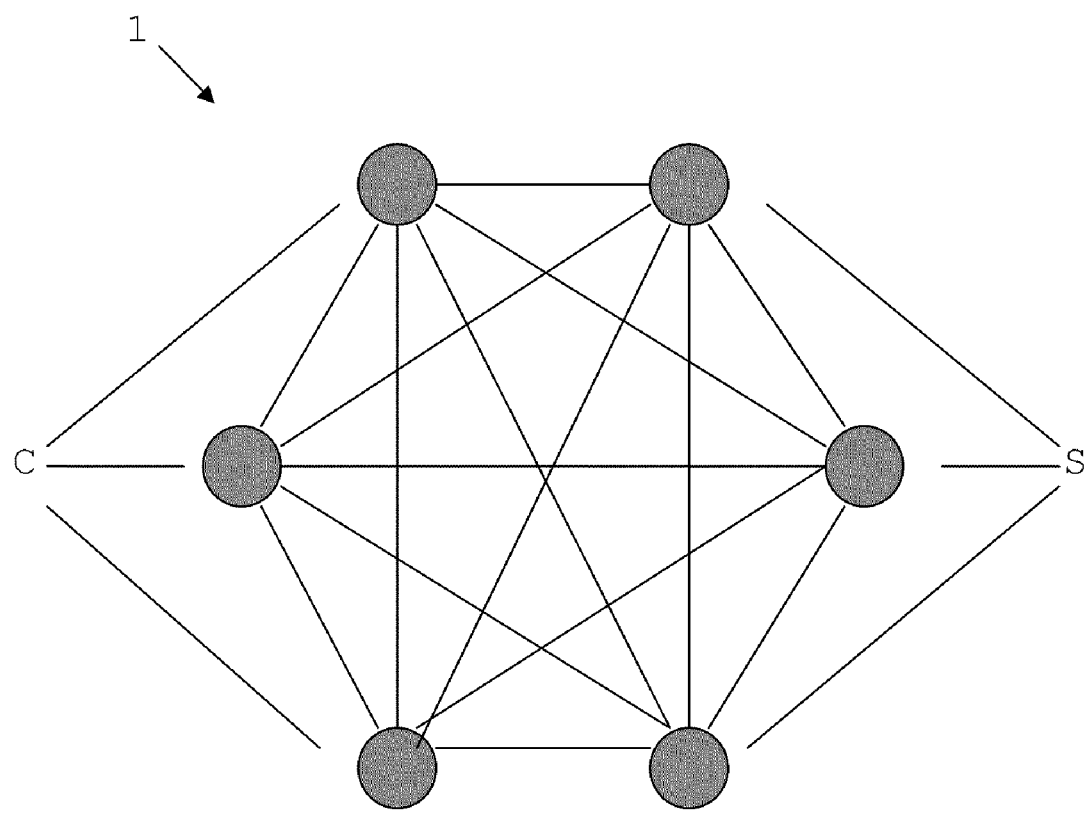
FIG. 7 shows a possible client-server environment in which another embodiment of the method according to the present invention can be used.

FIG. 7 shows a possible network structure in which a scoring system can be incorporated. A network system 1 is shown, which has a decentralized structure. There are shown a plurality of clients C and a plurality of servers S. The number N of clients C can be, but need not be identical to the number M of servers S. Also any other network topology, as for example a linear, a star, a bus and a centralized network topology are conceivable for incorporation of an embodiment of a scoring system according to the present invention. Within a messaging system the scoring system can be used to determine a user specific relevance score of a message and thereby constituting a user specific hierarchy within a plurality of messages. The scoring system comprises at least an analyzing component configured to analyze the meta-information of the message with respect to correlations of the message with other messages, a modeling component to establish a message model from the correlations found, a monitoring component which monitors how the message is processed, a calculating component configured to calculate a numerical relevance score for the document, the calculation being based on the message model and the monitoring how the message is processed, both with respect to the ranking scheme, and an assigning component configured to assign the calculated numerical relevance score to the respective message accordingly. The different components may be distributed among the different clients C and servers S. The calculating component can also be composed of several sub-components, each sub-component being situated on a server or a client. On the server side a message model as described with respect to FIGS. 3, 5 and 6 can be established with help of appropriate analyzing, monitoring and calculating sub-components. On the client side, a further sub-component can monitor and control processing of a single message by a user. The message can be classified with respect to how it is processed by the user. This can be done by means of a table as indicated in FIG. 4. An implicit rating based on the processing of a message can be derived therefrom. Alternatively, it is also possible that the user performs an explicit rating. It is possible for example that whenever the user receives a message, he can choose a certain rating by means of a display with appropriate icons.

In order to calculate a final numerical relevance score for a certain message, the relevance score derived from the message model as described for example in FIG. 3, 5 or 6 and the relevance score resulting from the monitoring sub-component of the client side have to be combined when no further criteria should be taken into account.

The actual relevance score of a message can be transferred to a specific client. In order to avoid a huge data traffic, this can be done at pre-given intervals only. The respective client preserves the relevance score of a message which has already been processed by the user. Only the respective relevance scores of those messages which have not been processed yet are actualized and probably displayed such that the user can adapt its handling regarding those messages in accordance with the respective actual relevance scores.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method to determine a user specific relevance score of a message, comprising:
deriving, from correlations between the message and other messages within a message thread containing the message, a message model reflecting the correlations of the message with the other messages in the message thread, the messages being represented by accordingly linked nodes, wherein each node in the message model represents a corresponding one of the messages contained within the message thread and the sender and recipient of the corresponding message; and
calculating, by a computer device, a numerical relevance score for the message, the calculation using a user specific ranking scheme and being based on the message model.

2. The method of claim 1, further comprising:
monitoring how the message is processed; and
wherein the numerical relevance score for the message is further based on the monitored processing.

3. The method of claim 1, further comprising:
assigning the calculated numerical relevance score to the respective node within the message model.

4. The method of claim 2, further comprising enabling a user to assign an explicit rating to the message with respect to at least one user specific criteria.

5. The method of claim 2, further comprising associating a user action on the message with an implicit rating to be assigned to the message.

6. The method according to claim 5, wherein the user action is one of the group consisting of "reading the message", "deleting the message", "saving the message in which folder", "classifying the message", "replying to the message", and "forwarding the message to how many recipients".

7. The method according to claim 1, wherein calculating the relevance score of the message is based on a previous given relevance score of the message and the relevance scores of the other messages in the message thread correlated with the message.

8. The method according to claim 7, wherein the calculated relevance score of the message is a second numerical function of the previous given relevance score of the message and a function value of a first numerical function of the relevance scores of the correlated messages.

9. The method according to claim 8, wherein the first and second functions are chosen, respectively, as any one of the group of functions: max(Z), min(Z) and ave(Z), wherein Z is a set of values.

10. The method according to claim 1, wherein the numerical relevance score of the message is recalculated and assigned dynamically to the message with respect to an actual handling of the message or of the correlated messages.

11. The method according to claim 10, wherein a recalculation of the relevance score of the message originates the recalculation of the respective relevance scores of the correlated messages, which is iteratively performed until a termination criteria is met.

12. The method according to claim 1, further comprising:
determining all messages correlated with the message as a first message forming together with the first message a set of messages;

noting respective relevance scores for all messages of the set of messages;

calculating with a first pre-given function a first numerical value from the relevance scores of the messages correlated with the first message;

calculating with a second pre-given function a second numerical value from the first numerical value and the relevance score of the first message;

in the event that the second numerical value differs from the relevance score of the first message, noting the second value as the relevance score of the first message and repeating with respect to a predefined termination criteria the previous steps for all messages of the set of messages other than the first message, and otherwise stopping.

13. The method according to claim 1, wherein the calculating is further responsive to an organizational context of the message.

14. The method according to claim 1, wherein the relevance score of the message is displayed to a user referring to the message.

15. The method according to claim 1, wherein the message model is transferable to any other user.

16. The method according to claim 1, wherein the message model is discarded if no user action took place for a defined lapse of time.

17. A scoring system to determine a user specific relevance score of a message within a messaging system including at least one computer device, the message being provided with message specific meta-information, the computer device including at least one computer readable memory having program code stored thereon, the program code comprising:

program code for deriving, from correlations between the message and other messages within a message thread containing the message, a message model reflecting the correlations of the message with the other messages in the message thread, the messages being represented by accordingly linked nodes, wherein each node in the message model represents a corresponding one of the messages contained within the message thread and the sender and recipient of the corresponding message; and program code for calculating, by the computer device, a numerical relevance score for the message, the calculation using a user specific ranking scheme and being based on the message model.

18. A computer program product embodied in a computer-readable memory having program code stored thereon for determining automatically a user specific relevance score of a message within a messaging system, the message being provided with message specific meta-information, the program code comprising:

program code for deriving, from correlations between the message and other messages within a message thread containing the message, a message model reflecting the correlations of the message with the other messages in the message thread, the messages being represented by accordingly linked nodes, wherein each node in the message model represents a corresponding one of the messages contained within the message thread and the sender and recipient of the corresponding message; and program code for calculating, by the computer device, a numerical relevance score for the message, the calculation using a user specific ranking scheme and being based on the message model.

* * * * *